(12) United States Patent
Lowder et al.

(10) Patent No.: US 12,451,668 B2
(45) Date of Patent: Oct. 21, 2025

(54) METHODS, SYSTEMS AND APPARATUS FOR REDUCING WASTE HEAT AND/OR LIGHT IN FIBER LASERS

(71) Applicant: NLIGHT, INC., Camas, WA (US)

(72) Inventors: Tyson L. Lowder, Camas, WA (US); Robert Joseph Foley, Camas, WA (US); Michael C. Nelson, Camas, WA (US)

(73) Assignee: nLIGHT, Inc., Camas, WA (US)

( * ) Notice: Subject to any disclaimer, the term of this patent is extended or adjusted under 35 U.S.C. 154(b) by 891 days.

(21) Appl. No.: 17/614,282

(22) PCT Filed: Jun. 15, 2020

(86) PCT No.: PCT/US2020/037804
§ 371 (c)(1),
(2) Date: Nov. 24, 2021

(87) PCT Pub. No.: WO2020/252480
PCT Pub. Date: Dec. 17, 2020

(65) Prior Publication Data
US 2022/0255296 A1    Aug. 11, 2022

Related U.S. Application Data (60) Provisional application No. 62/861,899, filed on Jun. 14, 2019.

(51) Int. Cl.
*H01S 5/06* (2006.01)
*H01S 3/16* (2006.01)
*H01S 5/042* (2006.01)

(52) U.S. Cl.
CPC .......... *H01S 5/0617* (2013.01); *H01S 3/1618* (2013.01); *H01S 5/042* (2013.01)

(58) Field of Classification Search
CPC ................................ H01S 3/094003
See application file for complete search history.

(56) References Cited

U.S. PATENT DOCUMENTS 6,690,504 B1 * 2/2004 Nagel ............... H01S 3/06754
359/337.11
2014/0269788 A1 9/2014 McComb et al.
(Continued)

FOREIGN PATENT DOCUMENTS

| CN | 103647212 A | 3/2014 |
| JP | 2017502504 A | 1/2017 |

(Continued)

OTHER PUBLICATIONS

English Translation of WO 2011013297 (Year: 2013).*
(Continued)

*Primary Examiner* — Minsun O Harvey
*Assistant Examiner* — Stephen Sutton Kotter
(74) *Attorney, Agent, or Firm* — Wiley Rein LLP (57) ABSTRACT

In an example, the disclosed technology includes a laser source, comprising a plurality of pump elements configured to generate laser light, a controller coupled to the plurality of pump elements, configured to select individual drive current levels to be provided to respective ones of the plurality of pump elements responsive to a request for a laser power level and at least one power supply coupled to one or more of the plurality of pump elements for driving individual pump elements at selected drive currents.

17 Claims, 7 Drawing Sheets

(56) References Cited

U.S. PATENT DOCUMENTS

2017/0149203 A1*  5/2017  Foley .................... H04L 9/0825
2018/0109066 A1*  4/2018  Cannon ................. H01S 3/1312

FOREIGN PATENT DOCUMENTS

WO    WO-2011013297 A1 *  2/2011   .......... H02M 7/5387
WO       2018/069930 A1     4/2018

OTHER PUBLICATIONS

RU Patent Office; International Search Report; PCT/US2020/037804 dated Aug. 27, 2020; 2 Pages.
Ru Patent Office; International Written Opinion; PCT/US2020/037804 dated Aug. 27, 2020; 4 Pages.

* cited by examiner

|     | 1kW | 2kW | 3kW | 4kW | 5kW | 6kW | 7kW | 8kW | 9kW | 10kW | 11kW | 12kW |
| --- | --- | --- | --- | --- | --- | --- | --- | --- | --- | --- | --- | --- |
| PM1 | 25% | 50% | 75% | 100% | 100% | 100% | 100% | 100% | 100% | 100% | 100% | 100% |
| PM2 | 0% | 0% | 0% | 0% | 25% | 50% | 75% | 100% | 100% | 100% | 100% | 100% |
| PM3 | 0% | 0% | 0% | 0% | 0% | 0% | 0% | 0% | 25% | 50% | 75% | 100% |

METHODS, SYSTEMS AND APPARATUS FOR REDUCING WASTE HEAT AND/OR LIGHT IN FIBER LASERS

RELATED APPLICATIONS

The present application is a National Phase entry under 35 U.S.C. § 371 of International Application No. PCT/US2020/037804, filed on Jun. 15, 2020, which claims priority to U.S. Provisional Application No. 62/861,899, filed on Jun. 14, 2019, the entire contents of these applications are incorporated herein by reference in their entirety.

TECHNICAL FIELD

The disclosure relates to methods and devices for protecting optical components from damage due to excessive waste heat and light.

BACKGROUND

High-power industrial laser systems generally produce beams having output powers in the range of several hundreds of Watts to >20 kW. It is often desirable to deliver the laser power to a processing head or work piece via an optical fiber. Laser systems that can be coupled into an optical fiber for delivery include, for example, fiber lasers, disk lasers, and diode- or lamp-pumped solid-state lasers.

Figure 1A:
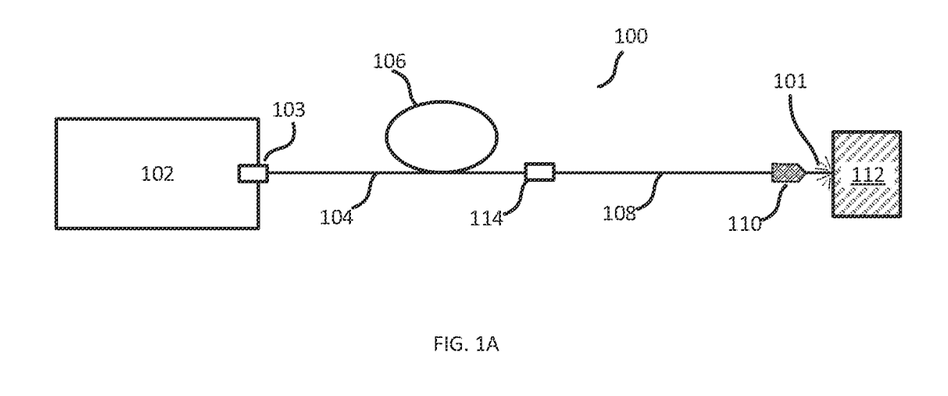
FIG. 1A depicts a conventional fiber laser system.

FIG. 1A depicts a high-level abstraction of a conventional fiber laser system 100. Fiber laser system 100 may be used in a variety of applications including additive manufacturing, welding heavy sheets of metal, cutting high-strength steel used to produce automobiles, cutting and drilling concrete, and microscale and nanoscale machining.

In an embodiment, laser system 100 includes a laser source 102 for generating pump light. Laser source 102 is configured to generate pump light via a single diode, an array of diodes, and/or a laser pump including a laser diode element driven by a laser diode driver with a corresponding control unit. Pump light generated by light source 102 is coupled via coupler 103 into an active fiber 104. In some examples a "coupler" may be a fusion splice or other device or method known to those of skill in the art for optically coupling light generated in light source 102 into fiber 104. Fiber 104 includes a gain region 106 to generate a laser beam 101. Gain region 106 may comprise an oscillator and/or amplifier. The output beam 101 of gain region 106 is optically coupled from fiber 104 to delivery fiber 108 via a fiber coupler or switch 114. Delivery fiber 108 delivers beam 101 to process head 110 that is configured to direct the beam onto a workpiece 112 or other substrate to perform a material processing function. In other examples, beam 101 may be used to perform a different function such as in directed-energy, imaging, testing and measurement applications. In such applications, beam 101 may be optically coupled to any of a variety of application appropriate assemblies known to those of skilling the art for directing beam 101 emission other than a process head 110.

Figure 1B:
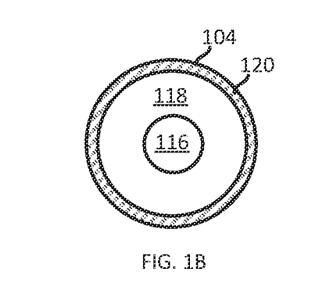
FIG. 1B is a cutaway view of a fiber laser, fiber cladding and core.

FIG. 1B depicts a cutaway view of active fiber 104 and/or fiber 108. Core 116 is surrounded by a cladding 118 and a protective coating 120. Core 116 may have a different refractive index than cladding 118 or coating 120. Depending on size, refractive index, and wavelength, core 116 may be single mode or multi-mode although single mode is preferred for many applications.

Core 116 may be made of a variety of materials including well-known silica-based materials. Core 116 may include a dopant from the lanthanide series of chemicals including but not limited to Erbium, Ytterbium, or Thulium that release light energy at useful wavelengths.

In typical fiber laser systems a signal beam is created in an active fiber by delivering a pump beam to a cladding and/or core of the active fiber. During operation fiber laser 100 may release heat that requires efficient heat removal to avoid damaging core 116 or cladding 118.

In these systems, the desired optical power is guided in the fiber core, but some power may also be present in the fiber cladding; this cladding light is undesirable because it can cause excessive heating of or damage to downstream components or optics, or it may otherwise interfere with work piece processing or other intended applications.

For peak optical-to-optical efficiency it is desirable to pump doped fiber lasers with pump light that is centered at or near the peak absorption wavelength corresponding to the doping material used in the fiber laser in the active fiber (e.g., for Ytterbium (Yb)-doped fiber lasers the peak absorption wavelength for pump light is near 976 nm). Besides optical-to-optical efficiency improvements, the strong absorption also allows for shorter fibers to be used in any given architecture which can be beneficial to push to higher peak powers before the detrimental onset of non-linear effects.

On the other hand, the strong absorption of the pump light in the active fiber can also lead to a high heat load in the fiber as the pump light is absorbed and converted to signal light through the lasing process. The high heat load in the active fiber of the laser or amplifier can contribute to significant instabilities to either the output power and/or beam quality of the laser. These instabilities are manifest through what is known as thermal- or transverse-mode-instabilities (TMI) or through other processes that have yet to be thoroughly investigated in the current literature.

Therefore, it is desirable to pump doped fiber laser architectures at peak absorption wavelengths to take advantage of the high optical-to-optical efficiencies, but to do it in such a way as to minimize the heat load of the system and avoid the onset of these instabilities.

Naturally, this can be done by using low concentrations of the rare earth doping substrates in the active fibers, however, as the pump wavelength drifts away from the absorption peak much of the pump light is unabsorbed. The unabsorbed pump light will transmit through the oscillator and/or amplifier architecture and will then interact with downstream optical components that might not be able to handle the additional power.

Figure 2:
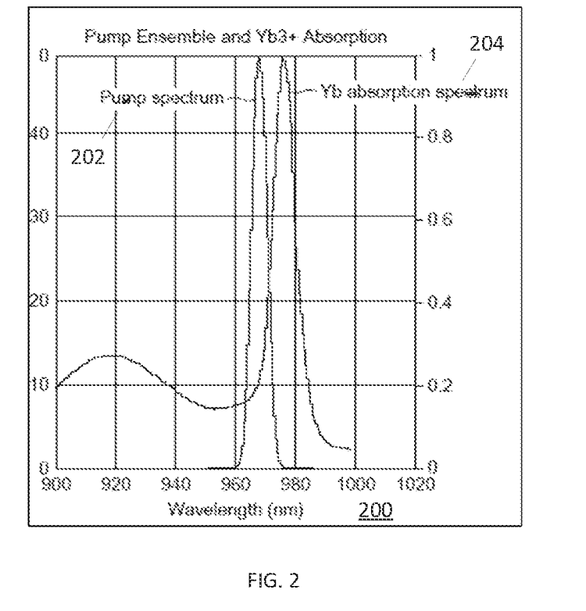
FIG. 2 is a graph showing an example of an off-wavelength of 976 nm pump spectrum versus a Yb-doped fiber laser absorption peak spectrum.

For cost and/or technical reasons the pump light in many fiber laser architectures might use unlocked pump diodes. As opposed to locked diodes which hold their output wavelength fairly constant, the unlocked pump diodes will change their wavelength as a function of current and/or temperature. This change in output pump wavelength presents a reliability concern to downstream components when the wavelength is not centered at the absorption peak and is passed through the oscillator and amplifier. One example of this occurs when a Yb-doped fiber laser system increases pump power from 0A to max current (where peak absorption wavelength for pump light is near 976 nm) by synchronizing the gradual increase of power output of all pump modules at the same time. FIG. 2 is a graph 200 showing the off-wavelength pump spectrum 202 compared to the Yb-doped fiber absorption spectrum 204 in such a Yb-doped fiber system. Because they do not overlap well, much of the pump power will be transmitted through the active fiber to downstream optical components such as couplers, switches, clad light strippers and the like or any combinations thereof.

Figure 3:
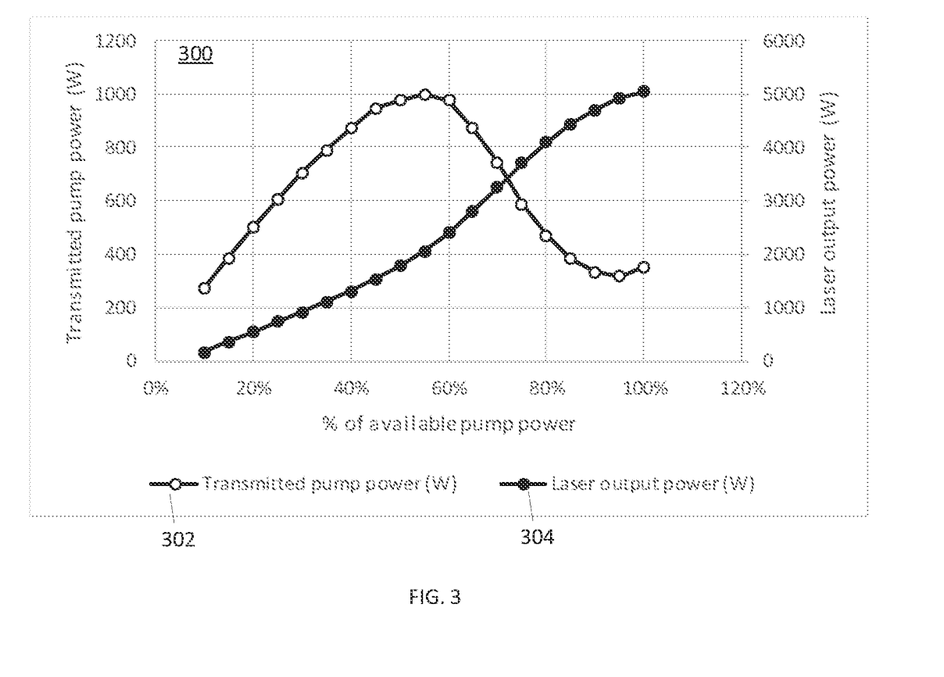
FIG. 3 is a graph showing transmitted pump power in watts (W) versus percentage of available pump power in a Yb-doped fiber laser system configured to increase pump power output of pump modules by synchronizing the power output of all pump modules.

FIG. 3 is a graph 300 showing peak transmitted pump power in watts (W) versus percentage of available pump power (line 302) in a Yb-doped fiber laser system configured to increase pump power output of pump modules by synchronizing the power output of all pump modules. In FIG. 3, line 304 shows laser output powers in W, as well. Transmitted pump power is the pump power that is not absorbed in the active fibers (e.g., a resonator/oscillator in some instances or a MOPA, i.e. oscillator and amplifier, in other instances). Transmitted pump power is captured as heat in downstream components and must be dissipated to avoid damage or failure. As noted, the peak pump transmission to the downstream components occurs when the pump wavelength does not coincide with the absorption peak. In the current example of a Yb-doped fiber laser architecture, this occurs in the mid-range of the percentage of available pump power (e.g., in the range of 40-60%).

SUMMARY

In an example, the disclosed technology includes a laser source, comprising a plurality of pump elements configured to generate laser light, a controller coupled to the plurality of pump elements, configured to select individual drive current levels to be provided to respective ones of the plurality of pump elements responsive to a request for a laser power level and at least one power supply coupled to one or more of the plurality of pump elements for driving individual pump elements at selected drive currents.

In an example, the controller can be configured to assign the drive current levels from a reference table of predefined drive current levels based on the requested power level, wherein the table is stored in memory coupled to the controller, wherein the reference table addresses incremental power level increases by progressively assigning drive currents to pump elements selected from the plurality of pump elements starting with a first pump element and adding each subsequent pump element after the first pump element and any other previous pump element has reach a highest threshold drive current level. The pump elements may be laser pumps including one or more unlocked laser diodes.

The reference table may be configured to define drive current levels for a plurality of output power levels and may preferentially assigns drive current levels associated with a predetermined peak absorption range or preferentially avoids assigning drive current levels associated with a predetermined peak transmission range, or a combination thereof. In some instances, drive current levels assigned individually to pump elements selected from the plurality of pump elements are the same or they may be are different.

The individual pump elements may not be assigned current levels associated with a predefined peak transmission range. In an example, the controller may be further configured to assign the current levels based at least in part on characteristics of the plurality of pump elements, such as on doping concentration or doping substrates or a combination thereof. The controller may be configured to generate one or more index tables that comprise a subset of the reference table.

In an example, the pump elements may comprise a plurality of pump modules, each comprising a plurality of laser diode drivers (LDDs) coupled to one or more respective laser diode pumps, wherein the LDDs are configured to drive respective pumps at the current levels identified by the controller so as to individually address each laser diode pump based on the requested power level and an absorption peak wavelength of a fiber laser coupled to the laser source.

In an example, a plurality of the pump elements may comprise a plurality of laser diodes including a plurality of laser diode drivers (LDDs) coupled to respective ones of the plurality of laser diodes, wherein the LDDs are configured to drive the respective laser diodes at individual current levels identified by the controller. The laser source may further comprising a gain fiber optically coupled to the pump elements wherein the gain fiber comprises ytterbium (Yb), neodymium (Nd), erbium (Er), thulium (Tm), or holmium (Ho), or a combination thereof.

The foregoing and other objects, features, and advantages will become more apparent from the following detailed description, which proceeds with reference to the accompanying figures which may not be drawn to scale.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and nonobvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples described with reference to directions indicated as "above," "below," "upper," "lower," and the like are used for convenient description, but do not imply any particular spatial orientation. Moreover, in the following examples, laser components and assemblies are described at a high level of abstraction and do not include a complete description of all mechanical, electrical and optical elements necessary for operation.

As used herein, optical radiation refers to electromagnetic radiation at wavelengths of between about 100 nm and 10 µm, and typically between about 500 nm and 2.5 µm. Examples based on available laser diode sources and optical fibers generally are associated with wavelengths of between about 800 nm and 2900 nm. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light or beams in some examples and need not be at visible wavelengths. Forward-propagating light or optical beams or beam portions refer to light, beams, or beam portions that propagate in a common direction with a processing beam that is directed to a target. Backward-propagating light or optical beams or beam portions refer to light, beams, or beam portions that propagate in a common and opposite direction of a processing beam that is directed to a target.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

In the examples disclosed herein, a waveguide core such as an optical fiber core is doped with a rare earth element such as Nd, Yb, Ho, Er, Tm or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

As discussed above, it is desirable to minimize the pump power transmission to downstream components to protect them from unabsorbed pump light. To minimize the amount of pump light that is generated by pump modules operating at lower currents where pump light that is lower than the peak absorption wavelength is generated, a pump current of individual pump elements is controlled asynchronously. In this way, pump elements can be successively increased to full power allowing a first pump element to reach full power before activating a subsequent pump element. The first pump element may then be left at full power while the next pump element is initialized. This enables a plurality of pump elements to generate a greater percentage of pump light at optimized current levels by minimizing the time spent in the less efficient current range. This method reduces the likelihood of damage to downstream components and improves optical-to-optical efficiency over conventional methods.

Figure 4:
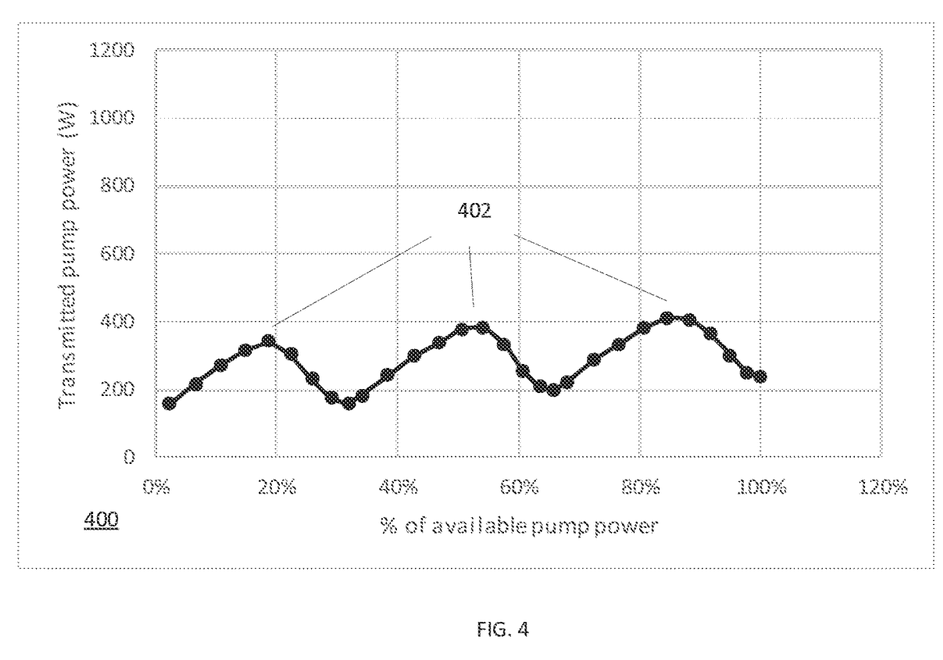
FIG. 4 is a graph showing transmitted pump power in watts (W) versus percentage of available pump power in an example Yb-doped fiber laser system configured to increase pump power output of pump modules asynchronously and/or individually.

FIG. 4 is a graph 400 showing transmitted pump power in watts (W) versus percentage of available pump power in an example Yb-doped fiber laser system configured to increase pump power output of pump modules asynchronously and/or individually. In comparison to data provided in FIG. 3, the graph 400 in FIG. 4 shows that when individual pump modules are controlled asynchronously the amount of pump power transmitted downstream is reduced. Graph 400 shows that controlling individual pump elements independently minimizes the peak transmittance 402 of pump power to downstream components. Graphs 300 and 400 are based on data using the same Yb-doped fiber laser system. However, excessive transmitted pump power can be a problem in many fiber laser system architectures such as, for example, rare-earth doped fiber laser systems that utilize conventional unlocked pump diodes. Such pump diodes are intended to produce pump light at the same wavelength as the doping agent-absorption peak when operated at their designed operating power/current, but when they are operating at lower power/currents they will change their wavelength as a function of current and/or temperature potentially causing damage or failures. Thus, individually addressing pump modules so as to control them asynchronously can reduce transmitted pump power in many fiber laser systems in addition to Yb-doped fiber laser systems.

Figure 5A:
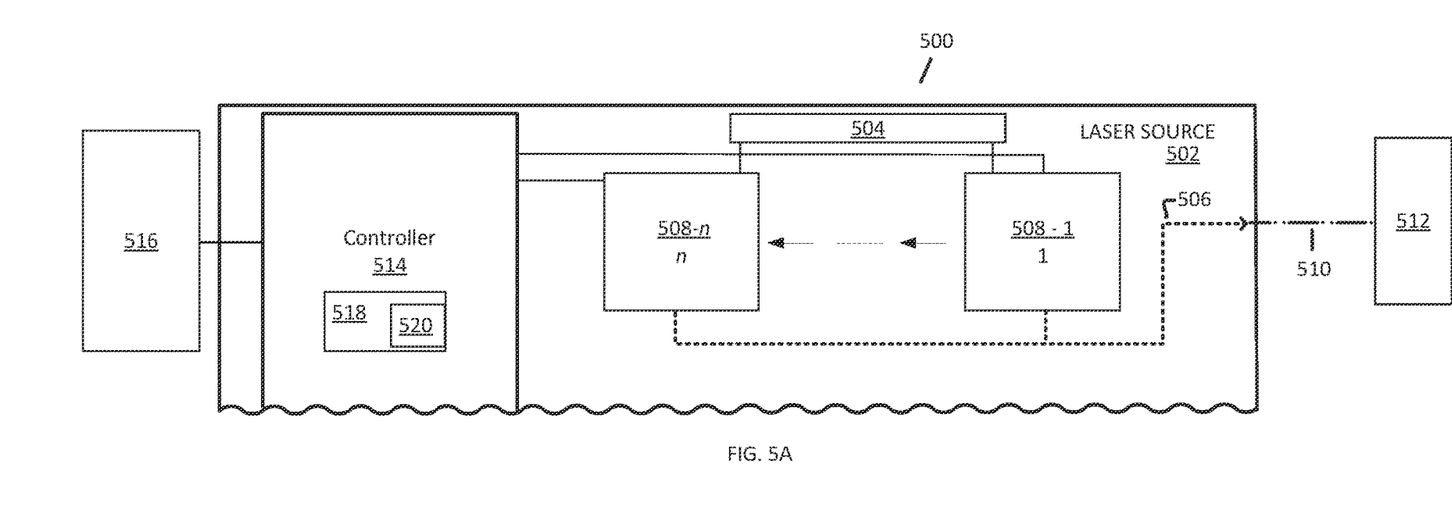
FIG. 5A illustrates an example laser source system configured to control individual pump elements asynchronously.

FIG. 5A is a schematic illustrating an example laser system 500 comprising laser source 502 configured to control individual pump elements asynchronously. Laser source 502 comprises a plurality of pump elements 508-1-$n$ where n is a number of pump elements. Pump elements 508-1-$n$ may be configured to generate laser pump light (as optical beam 506). A 'pump element' may be any device operable to generate pump light. For example, a pump element may comprise: individual laser diodes, unlocked diodes, one or more laser diode pumps (each comprising an array of n individual laser diodes); a pump module (PM) comprising a subassembly of one or more diode pumps (each comprising an array of n individual laser diodes) and corresponding one or more laser diode drivers (LDDs), or the like or a combination thereof.

In an example, beam 506 generated by pump elements 508-1-$n$ may be coupled into and pump gain media in one or more fiber lasers 510 to form a processing beam for use in processing system 512. Laser source 502 may further comprise a controller 514 coupled to the plurality of pump elements 508-1-$n$. An AC/DC power supply 504 provides a current to pump elements 508-1-$n$ to provide necessary optical power for beam 506 to pump fiber laser 510.

In an example, controller 514 is operable to select individual current levels to asynchronously drive pump elements 508-1-$n$. Controller 514 receives input from user interface 516 identifying a user selected laser power level. Power levels may be selected and communicated to controller 514 by a user or selected automatically or responsive to sensor feedback or in a variety of other ways and claimed subject matter is not limited in this regard.

An FPGA 518, or other similar controller device (e.g., PLC, PLD, CPLD, PAL, ASIC, etc.), coupled to controller 514 is configured to produce a digital output such as a table 520 that identifies individual pump current levels for pump elements 508-1-$n$. For clarity and illustrative purposes, a "table 520" will be used throughout the remainder of the description herein as a non-limiting example of an FPGA 518 digital output addressing and/or assigning drive current levels for pump elements 508-1-$n$ in laser source 502. Controller 514 may select the individual drive current levels from the table generated in FPGA 518 based on the identified laser power level. Current levels assigned individually to pump elements 508-1-$n$ may be the same or different.

In an example, based on table 520 generated by FPGA 518 and depending on the power level requested, pump elements 508-1-$n$ are driven in sequence to a threshold current level before initiating a subsequent pump element to minimize the amount of pump light generated at lower currents. The threshold current level may be a maximum current available for laser source 502 or may be a different predetermined threshold current level. In some examples, the threshold may be selected based on a point at which the current level is sufficient to prevent generation of pump light beam 506 at wavelengths below peak absorption wavelengths in fiber laser 510 or other optical fibers in processing system 512. Ramping of the current levels may be gradual or stepwise.

In an example, a current level assigned to specific pump elements 508-1-$n$ may vary depending on a variety of factors including but not limited to: number of individually addressable pump elements, power level of the power supply, wavelength absorption peak in the pumped fiber, peak transmission wavelength of the pumped fiber, or the like or any combinations thereof. Table 520 may preferentially assign drive current levels associated with a predetermined peak absorption range to individual pump elements of the plurality of pump elements 508-1-$n$. Likewise, table 520 may preferentially avoid or minimize the number of individual pump elements of the plurality of pump elements 508-1-$n$ assigned drive current levels associated with a predetermined peak transmission range of the associated fiber laser 510 and/or fiber laser system 512. This may reduce generation of pump light beam 506 at current levels that do not correspond to a defined peak absorption range for the associated fiber laser 512 in order to avoid increased transmission of pump light to downstream components and subsequent temperature increase, as discussed above.

Figure 5B:
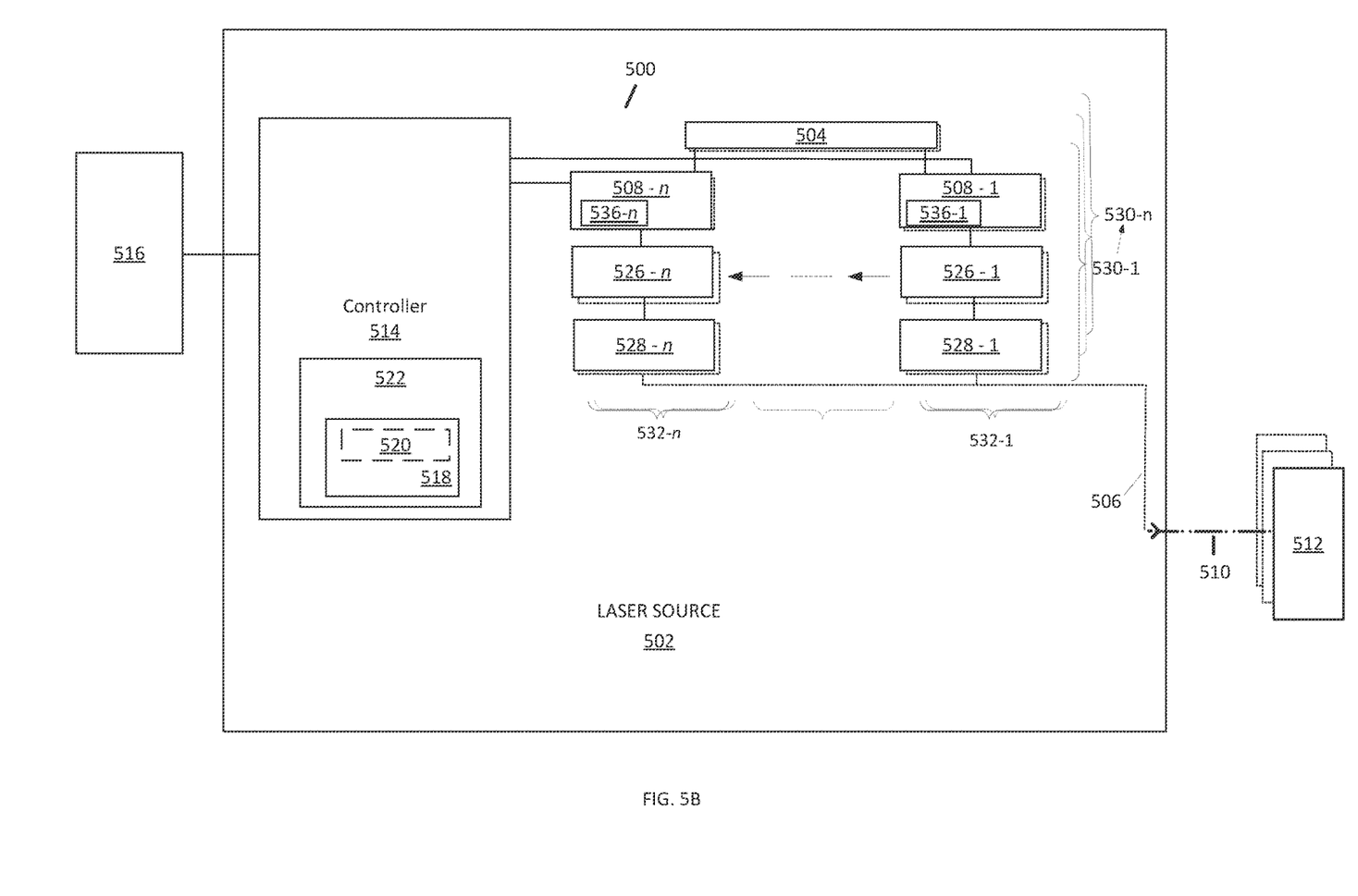
FIG. 5B illustrates a more detailed view of the example laser system depicted in FIG. 5B configured to control individual pump elements asynchronously.

FIG. 5B is a schematic illustrating additional details of example laser system 500. In an example, laser source 502 includes one or more power supplies 504 coupled to respective pump elements comprising pump modules 508-1-$n$. Pump modules 508-1-$n$ may comprise a sub-assembly including one or more laser diode drivers (LDDs) 526-1-$n$ coupled to respective laser diode pumps 528-1-$n$. Pump modules 508-1-$n$ may include a plurality of pumps 528-1-$n$. Pumps 528-1-$n$ each comprise one or more laser diode (LD) arrays.

In an example, pump modules 508-1-$n$ are coupled to digital controller 514 via a connector enabling selection of individual drive currents by methods discuss above. When controller 514 receives a request for a particular fiber laser power level, the controller retrieves the current for one or more of the pump modules 508-1-$n$. Individual drive currents are communicated to the pump modules 508-1-$n$ and stored in respective FPGAs 536-1-$n$ or other similar controller device. LDDs 526-1-$n$ may drive LD arrays in pumps 528-1-$n$ at the selected current level for respective pumps 528-1-$n$. In another example, individual laser drive currents may be specified and independently provided to each of the LD arrays in pumps 528-1-$n$.

In some examples, the FPGA 518 provides an output, such as table 520 to controller 514 for selecting the individual drive currents to be communicated and/or stored in pump module 508-1-$n$ which each may include a memory device that stores a current selection table, or predetermined thresholds or parameters for setting current levels for individual pump modules, e.g., based on a transmission and/or absorption range.

In an example, laser system 500 components may be organized in such a way as to assign groups of pump elements individual currents such that the groups of pumps operate together but asynchronously with respect to each other. Such an assembly may enable a fiber laser system 500 to utilize one or more pump-banks (PB) 530-1-$n$ disposed in laser source 502 each comprising a set of PMs 508-1-$n$ that are each operable to provide pump light to an individual single oscillator and/or amplifier. In an example, multiple pump-banks (PB) 530-1-$n$ may be coupled to respective ones of multiple oscillators and/or amplifiers combined through a signal combiner or some other method for combining optical power. Power legs 530-1-$n$ are groups of pumps that may be treated the same for efficiency or other reasons.

Figure 6A:
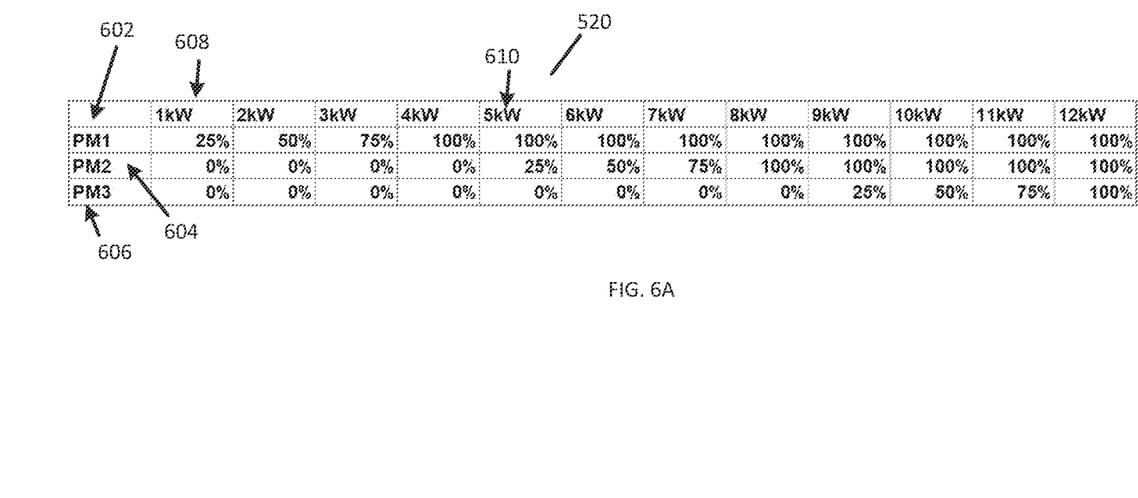
FIG. 6A illustrates an example table for assigning current levels for individual pump elements asynchronously.

FIG. 6A depicts an example partial table 520 showing current values for three of the pump modules 508-1-3 depicted in FIG. 5B. Table 520 prescribes current values for each of the three pumps identified in the table as PM1-PM3 labeled 602-606. Drive current values increase progressively between 0%-100% (full power/current) and are assigned asynchronously and individually to PM1-PM3.

In table 520, when the requested power level is 1 kW 608 the prescribed drive current level is 25% of full current on PM1. Drive current increases on PM1 602 until it reaches full current for the system. When the requested power exceeds the first pumps capacity to supply power at 5 kW, PM2 604 is driven to 25% in addition to PM1 remaining at 100%. In a similar progressive manner, as the requested power levels increase, percent of current is increased until each pump reaches full current or a threshold level current and then subsequent pump elements are added. In some examples, table 520 may have thousands of entries and may have many pumps.

As discussed above, excessive transmitted pump power can be a problem in many fiber laser system architectures. Unlocked pump diodes are intended to produce pump light at the same wavelength as the doping agent-absorption peak when operated at their designed operating power/current, but when they are operating at lower power/currents they will change their wavelength as a function of current and/or temperature potentially causing damage or failures. Table 520 prescribes pump current levels that reduce the amount of transmitted pump power by maximizing drive current to operating pump diodes at levels preferentially out of a peak transmission range or threshold that is most likely to cause the unlocked pumps to generate light at wavelengths below the peak absorption wavelength of the fiber laser system within which they are operating. In some cases, pump modules may have to operate at current levels that are not optimal for periods of time. However, with this method, all pumps are typically not operating at the same suboptimal current range at the same time thus mitigating the impact of transmitted power to downstream components.

Figure 6B:
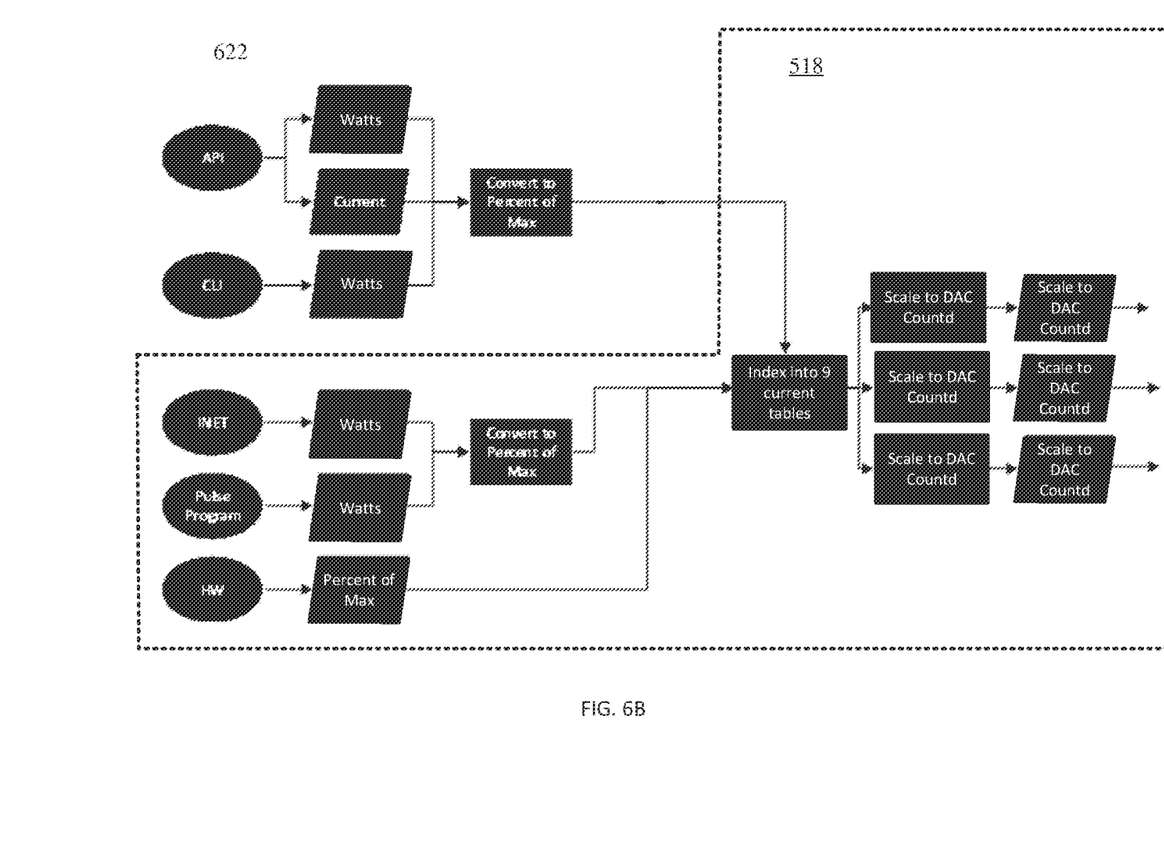
FIG. 6B is a flow diagram illustrating an example process for generating reference tables for assigning current levels for individual pump elements asynchronously.

FIG. 6B is a schematic diagram showing firmware 622 and FPGA 518 operation as illustrated in FIG. 5B. Once the power level is requested, the firmware 622 converts the requested power level to a percent of the maximum power level. That data is then used by the FPGA 518 to index a number of tables (nine tables in the current example) that will be used to assign current levels to the pump modules 508-1-n.

Having described and illustrated the general and specific principles of examples of the presently disclosed technology, it should be apparent that the examples may be modified in arrangement and detail without departing from such principles. We claim all modifications and variation coming within the spirit and scope of the following claims.

The invention claimed is:

1. A laser source, comprising:
   a plurality of pump elements configured to generate laser light;
   a controller coupled to the plurality of pump elements, configured to select individual drive current levels to be provided, asynchronously, to respective ones of the plurality of pump elements responsive to a request for a laser power level and further configured to assign the current levels based at least in part on doping concentration or doping substrates or a combination thereof in a fiber laser optically coupled to one or more of the plurality of pump elements; and
   at least one power supply coupled to one or more of the plurality of pump elements for driving individual pump elements at selected drive currents.

2. The laser source of claim 1, wherein the controller is configured to assign the drive current levels from a reference table of predefined drive current levels based on the requested power level, wherein the table is stored in memory coupled to the controller.

3. The laser source of claim 2, wherein the reference table is stored in an FPGA memory.

4. The laser source of claim 2, wherein the reference table defines drive current levels for a plurality of output power levels.

5. The laser source of claim 4, wherein the reference table preferentially assigns drive current levels associated with a predetermined peak absorption range.

6. The laser source of claim 4, wherein the reference table preferentially avoids assigning drive current levels associated with a predetermined peak transmission range.

7. The laser source of claim 4, wherein the individual pump elements are not assigned current levels associated with a predetermined peak transmission range.

8. The laser source of claim 1, wherein the controller is further configured to assign the current levels based at least in part on characteristics of the plurality of pump elements.

9. The laser source of claim 1, wherein the controller is configured to generate one or more index tables that comprise a subset of the reference table.

10. The laser source of claim 1, wherein the pump elements comprise a plurality of pump modules, each comprising a plurality of laser diode drivers (LDDs) coupled to one or more respective laser diode pumps, wherein the LDDs are configured to drive respective pumps at the current levels identified by the controller so as to individually address each laser diode pump based on the requested power level and an absorption peak wavelength of a fiber laser coupled to the laser source.

11. The laser source of claim 1, wherein the plurality of pump elements comprise a plurality of laser diodes including a plurality of laser diode drivers (LDDs) coupled to respective ones of the plurality of laser diodes, wherein the LDDs are configured to drive the respective laser diodes at individual current levels identified by the controller.

12. The laser source of claim 1, further comprising a gain fiber optically coupled to the pump elements.

13. The laser source of claim 12, wherein the gain fiber comprises ytterbium (Yb), neodymium (Nd), erbium (Er), thulium (Tm), or holmium (Ho), or a combination thereof.

14. The laser source of claim 1, wherein the pump elements are laser pumps including one or more unlocked laser diodes.

15. The laser source of claim 1, wherein the drive current levels assigned individually to pump elements selected from the plurality of pump elements are the same.

16. The laser source of claim 1, wherein the drive current levels assigned individually to pump elements selected from the plurality of pump elements are different.

17. A laser source, comprising:
   a plurality of pump elements configured to generate laser light;
   a controller coupled to the plurality of pump elements, configured to select individual drive current levels to be provided, asynchronously, to respective ones of the plurality of pump elements responsive to a request for a laser power level wherein the controller is configured to assign the drive current levels from a reference table of predefined drive current levels based on the requested power level, wherein the reference table is stored in memory coupled to the controller and addresses incremental power level increases by progressively assigning drive currents to pump elements selected from the plurality of pump elements starting with a first pump element and adding each subsequent pump element after the first pump element and any other previous pump element has reach a highest threshold drive current level; and
   at least one power supply coupled to one or more of the plurality of pump elements for driving individual pump elements at selected drive currents.

* * * * *